H. A. HARRAH.
TRACTOR.
APPLICATION FILED SEPT. 12, 1918.
1,309,408.
Patented July 8, 1919.
2 SHEETS—SHEET 1.
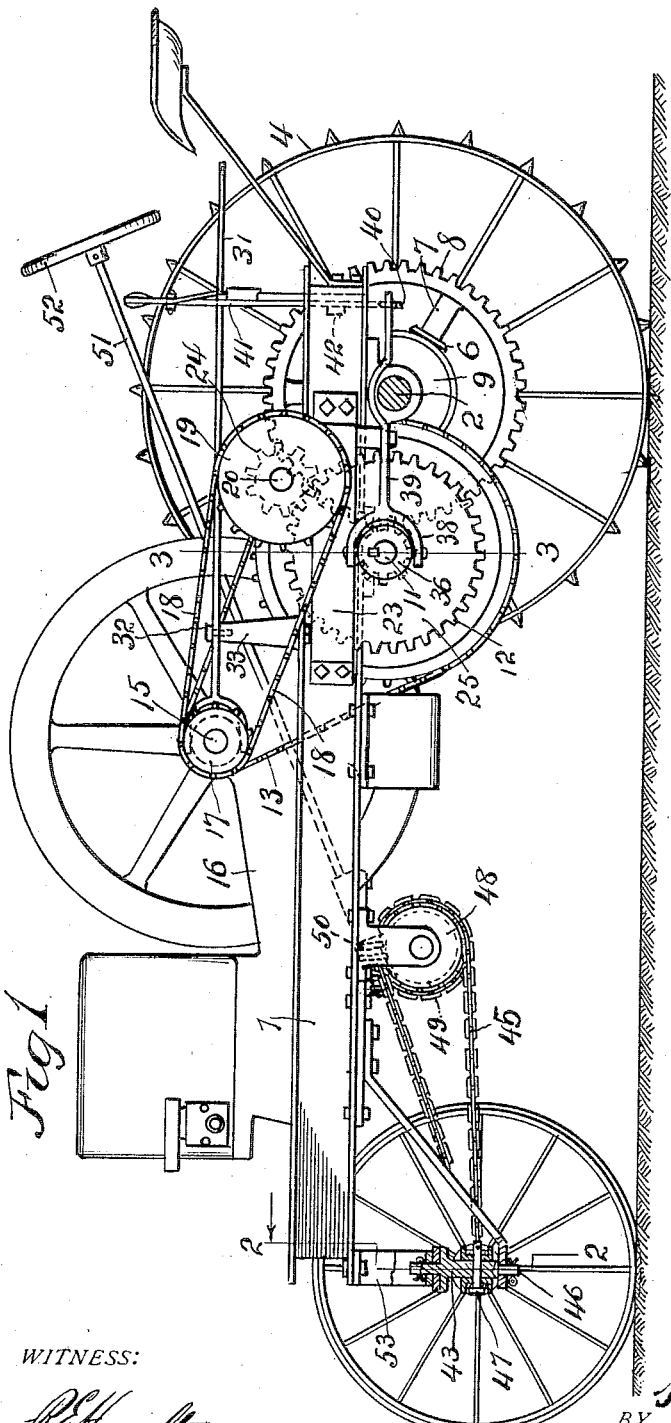
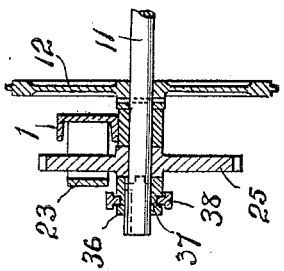
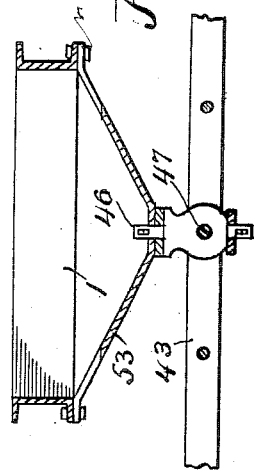
WITNESS:
R. E. Hamilton
INVENTOR.
Hillis A. Harrah
BY Warren D. House
His ATTORNEY

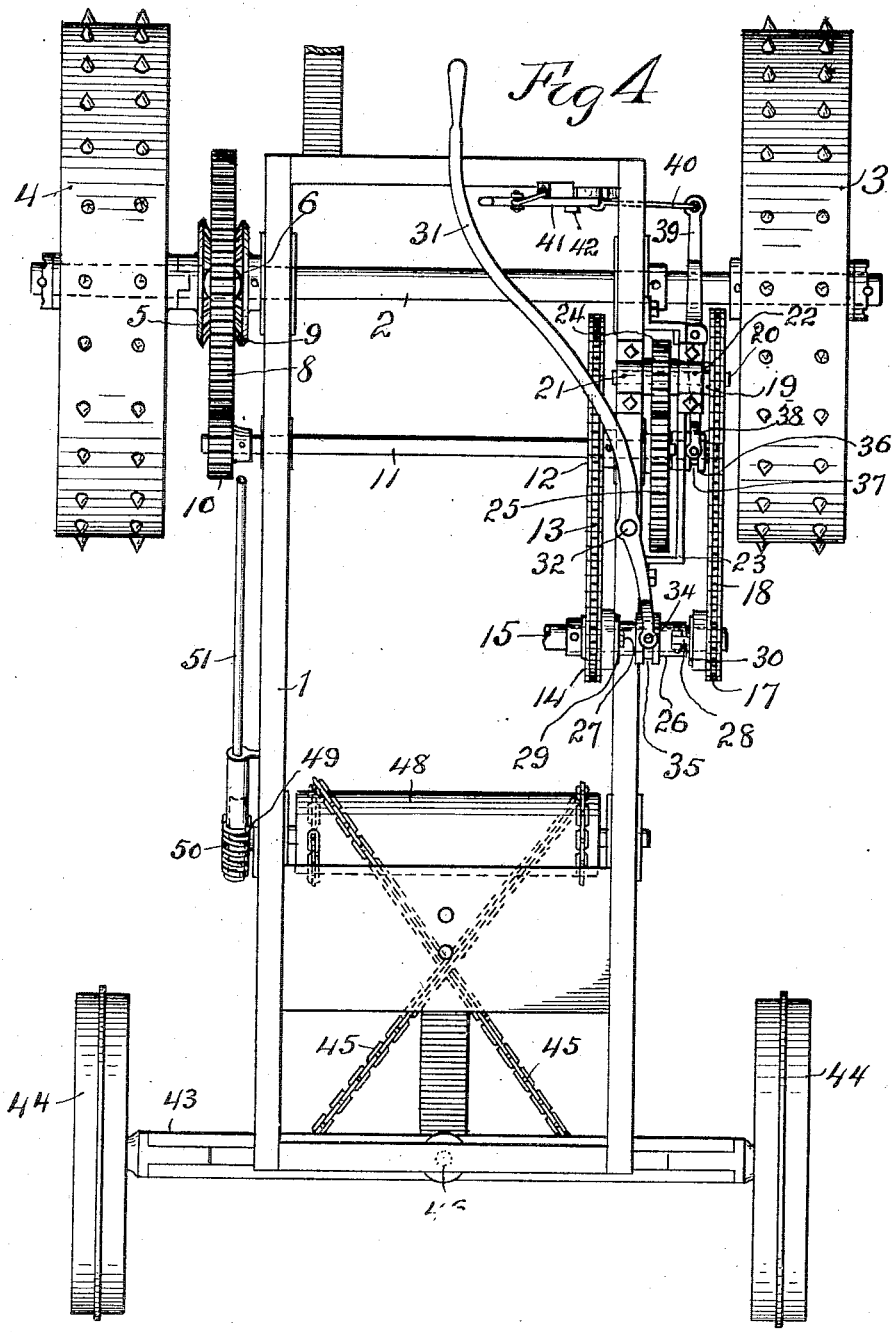

UNITED STATES PATENT OFFICE.

HILLIS A. HARRAH, OF KANSAS CITY, MISSOURI.

TRACTOR.

1,309,408.    Specification of Letters Patent.    Patented July 8, 1919.

Application filed September 12, 1918. Serial No. 253,674.

*To all whom it may concern:*

Be it known that I, HILLIS A. HARRAH, a citizen of the United States, residing at Kansas City, in the county of Jackson and State of Missouri, have invented a certain new and useful Improvement in Tractors, of which the following is a specification.

My invention relates to improvements in tractors.

The object of my invention is to provide a driving mechanism for tractors, which is exceedingly simple in construction, which is not liable to get out of order, which is cheap to manufacture and efficient in operation, and which may be with equal facility employed to drive the tractor forwardly or backwardly.

The novel features of my invention are hereinafter fully described and claimed.

In the accompanying drawing, which illustrates the preferred embodiment of my invention, Figure 1 is a side view, partly in side elevation and partly broken away.

Fig. 2 is a cross section on the line 2—2 of Fig. 1.

Fig. 3 is a vertical sectional view on the line 3—3 of Fig. 1.

Fig. 4 is a plan view, partly broken away, and some of the parts removed, of a tractor provided with my improvement.

Similar reference characters designate similar parts in the different views.

1 designates the frame of the tractor, which is preferably a rectangular frame composed of channel iron.

2 designates the rear axle rotatably mounted on the frame 1 and having rigidly secured to it a traction wheel 3.

Rotatably mounted on the axle 2 is a traction wheel 4 to which is secured the hub of a bevel gear wheel 5, which is also rotatable on the axle 2 and which meshes with intermediate bevel gear wheels 6, which are rotatably mounted in the usual manner on radial spokes 7 of a driving spur gear wheel 8, which is rotatably mounted on the axle 2.

Secured to the axle 2 and rotatable therewith at the inner side of the spur gear wheel 8 is a bevel gear wheel 9, which meshes with the gear wheels 6. The gear wheels 5, 6, 8 and 9, form the ordinary differential gear mechanism, such as is employed in automobile and tractor structures.

Meshing with the gear wheel 8 is a pinion 10 which is rigidly secured to a horizontal shaft 11 disposed transversely and rotatably mounted on the frame 1, Fig. 4, and which has rigidly secured to it a sprocket wheel 12 which is connected by a chain belt 13 with a sprocket wheel 14 rotatably mounted on the crank shaft 15 of an ordinary explosive engine 16, shown in Fig. 1.

Rotatably mounted on the crank shaft 15 is a sprocket wheel 17, which is connected by a chain belt 18 with a sprocket wheel 19 which is rigidly secured to a transverse horizontal shaft 20, which is rotatably mounted in a bearing 21 mounted on the frame 1 and in a bearing 22 mounted on a bracket 23, which is secured to the frame 1.

Rigidly secured to the shaft 20 is a spur gear wheel 24, which meshes with a spur gear wheel 25 rotatably mounted on the shaft 11.

The crank shaft 15 is assumed to rotate in a clockwise direction, as viewed in Fig. 1. When the sprocket wheel 14 is made to have driving engagement with the crank shaft 15, the traction wheels 3 and 4 will be driven forwardly through the intermediacy of the chain belt 13, sprocket wheel 12, shaft 11, pinion 10, gear wheels 8, 6, 9 and 5, and axle 2.

For alternately engaging the sprocket wheels 14 and 17 in driving engagement with the crank shaft 15, I provide between said gear wheels a clutch member 26, which is longitudinally slidable on the shaft 15 and which is rotatable therewith and which pivotally engages two arms 27 and 28, Fig. 4, of two clutches 29 and 30, which are of the usual type, and which respectively engage in driving engagement the two sprocket wheels 14 and 17, when the member 26 is moved to the proper positions.

For sliding the clutch member 26 from a neutral position into engagement with either of the clutches 29 and 30, I provide a manually operated lever 31, which is pivoted by a vertical pin 32 to an upright standard 33, which is supported by the frame 1.

The forward end of the lever 31 is bifurcated and has the usual pins 34, which are located in the usual manner in a peripheral groove 35 provided in the clutch member 26.

When the lever 31 is swung to engage the clutch 30 with the sprocket wheel 17, the traction wheels 3 and 4 will be rotated backwardly, so as to back the tractor through the intermediacy of the sprocket wheel 17, sprocket chain 18, sprocket wheel 19, shaft 20, gear wheels 24 and 25, shaft 11 and the mechanism driven by the shaft 11, which has already been described.

In order that the gear wheel 25 may have locked engagement with the shaft 11, the latter has rotatable therewith and slidable thereon longitudinally a clutch member 36, which is provided with a peripheral groove 37, in which are mounted the arms 38 of a manually operated lever 39, to the rear end of which, Fig. 4, is pivoted at one end of a transverse link 40, the other end of which is pivoted to the lower end of a lever 41, which is manually operated and which is pivoted by a horizontal bolt 42 to the frame 1. By means of the lever 41, the clutch member 36 may be moved into and out of locked engagement with the hub of the sprocket wheel 25.

When it is desired to propel the tractor ahead, the lever 41 is swung so as to release the clutch member 36 from the gear wheel 25. The lever 31 is then swung so as to engage the clutch 29 with the sprocket wheel 14. The traction wheels 3 and 4 will now be driven forwardly by the mechanism already described.

In order to back the tractor, the lever 31 is swung forward to engage the clutch 30 with the sprocket wheel 17, and the lever 41 is swung so as to lockingly engage the clutch member 36 with the gear wheel 25, thus turning the traction wheels backwardly by the mechanism already described.

The forward end of the frame 1 is supported pivotally in the usual manner on a front axle 43, on which are rotatably mounted the usual front wheels 44.

Two chains 45 have their forward ends attached to the axle 43 at opposite sides of the king bolt 46, shown in Figs. 1 and 2, and which is pivoted by means of a horizontal longitudinal bolt 47 to the axle 43. This manner of pivoting the king bolt 46 to the axle and to the frame 1 permits the axle 43 to swing on a vertical and also on a horizontal longitudinal pivot, for the purposes of turning and accommodating the tractor wheels to uneven ground.

The chains 45 cross each other and are attached at their rear ends to the periphery of a horizontal transverse drum 48, rotatably mounted on the frame 1 and provided at one end with a worm wheel 49 which meshes with a worm 50 provided at the forward end of a forwardly and downwardly inclined steering shaft 51, which is rotatably mounted on the frame 1, and which at its rear end is provided with a hand wheel 52.

Pivotal connection between the king bolt 46 and the frame 1 is obtained by means of a bolster 53, Fig. 2, which is secured to the under side of the forward end of the frame 1, and through which the upper end of the king bolt 46 is extended and pivotally mounted.

I do not limit my invention to the structure shown and described, as modifications, within the scope of the appended claims, may be made without departing from the spirit of my invention.

What I claim is:—

1. In a tractor, two traction wheels, a driving shaft, an intermediate shaft, means actuated by the intermediate shaft for driving said traction wheels, two sprocket wheels rotatable on the driving shaft, clutch mechanism adapted for alternate driving engagement with the two sprocket wheels and rotatable with the driving shaft, a third rotatable shaft, two sprocket wheels secured respectively to the intermediate shaft and to the third shaft, two sprocket chain belts respectively connecting the sprocket wheels on the driving shaft with the other two sprocket wheels, two spur gear wheels meshing with each other and mounted one on and secured to the third shaft, the other being rotatable on the intermediate shaft, and manually operated means for releasably locking the intermediate shaft and the said gear wheel which is mounted thereon together.

2. In a tractor, two traction wheels, a driving shaft, an intermediate shaft, means actuated by the intermediate shaft for driving the traction wheels, two sprocket wheels rotatable on the driving shaft, clutch mechanism rotatable with the driving shaft and adapted to have alternate driving engagement with said sprocket wheels, a third rotary shaft, two sprocket wheels, one rotatable on the intermediate shaft and the other secured to the third shaft, two belts respectively connecting the sprocket wheels on the driving shaft with the other two sprocket wheels and means connecting the intermediate and third shafts and including a clutch by which rotation of the third shaft in one direction imparts rotation in the opposite direction to the intermediate shaft.

3. In a tractor, two traction wheels, a driving shaft, an intermediate shaft, means actuated by the intermediate shaft for driving said traction wheels, two sprocket wheels rotatable on the driving shaft, means for alternately locking the sprocket wheels to the driving shaft, two sprocket wheels one of which is secured to the intermediate shaft, means including a clutch connecting the other of said last named sprocket wheels with the intermediate shaft by which rotation of the last named sprocket wheel imparts rotation in the opposite direction to the intermediate shaft, and two belts respectively connecting the sprocket wheels on the driving shaft with the other two sprocket wheels.

In testimony whereof I have signed my name to this specification.

HILLIS A. HARRAH.